(12) United States Patent
Back et al.

(10) Patent No.: US 12,552,735 B2
(45) Date of Patent: Feb. 17, 2026

(54) PROCESS FOR THE SYNTHESIS OF TWIN-TAIL TRIAMINES

(71) Applicant: SYENSQO SA, Brussels (BE)

(72) Inventors: Olivier Back, Lyons (FR); Zhen Yan, Shanxi (CN)

(73) Assignee: SYENSQO SA, Brussels (BE)

( * ) Notice: Subject to any disclaimer, the term of this patent is extended or adjusted under 35 U.S.C. 154(b) by 893 days.

(21) Appl. No.: 17/787,817

(22) PCT Filed: Dec. 19, 2019

(86) PCT No.: PCT/CN2019/126540
§ 371 (c)(1),
(2) Date: Jun. 21, 2022

(87) PCT Pub. No.: WO2021/120090
PCT Pub. Date: Jun. 24, 2021

(65) Prior Publication Data
US 2023/0339841 A1    Oct. 26, 2023

(51) Int. Cl.
*C07C 209/26*    (2006.01)

(52) U.S. Cl.
CPC .................. *C07C 209/26* (2013.01)

(58) Field of Classification Search
None
See application file for complete search history.

(56) References Cited

U.S. PATENT DOCUMENTS

| | | | |
|---|---|---|---|
| 4,373,107 A | 2/1983 | Tahara et al. | |
| 5,225,597 A | 7/1993 | Kurek | |
| 6,111,141 A | 8/2000 | Eller et al. | |
| 8,445,726 B2 | 5/2013 | Wigbers et al. | |
| 10,221,127 B2 | 3/2019 | Du et al. | |
| 2004/0015016 A1 | 1/2004 | Su et al. | |
| 2009/0326272 A1 | 12/2009 | Ishii et al. | |
| 2012/0295832 A1 | 11/2012 | Constien et al. | |
| 2019/0218169 A1 | 7/2019 | Clendennen et al. | |

FOREIGN PATENT DOCUMENTS

| | | |
|---|---|---|
| CN | 102199098 A | 9/2011 |
| JP | H11343269 A | 12/1999 |
| JP | 2014118385 A | 6/2014 |
| WO | 2007104357 A1 | 9/2007 |
| WO | 2007104359 A1 | 9/2007 |
| WO | 2008001719 A1 | 1/2008 |
| WO | 2009051661 A2 | 4/2009 |
| WO | 2011124619 A1 | 10/2011 |
| WO | 2017174417 A1 | 10/2017 |
| WO | 2017174424 A1 | 10/2017 |
| WO | 2018087188 A1 | 5/2018 |

OTHER PUBLICATIONS

International Search Report issued in corresponding Application No. PCT/CN2019/126540 dated Sep. 24, 2020, (4 pages).
Written Opinion issued in corresponding Application No. PCT/CN2019/126540 dated Sep. 18, 2020, (7 pages).
Supplementary European Search Report issued in corresponding EP Application No. 19956612 dated Jan. 24, 2024 (5 pages).

*Primary Examiner* — Renee Claytor
*Assistant Examiner* — Jennifer C Sawyer
(74) *Attorney, Agent, or Firm* — Osha Bergman Watanabe & Burton LLP

(57) ABSTRACT

The invention relates to a new method for producing twin-tail triamines, preferably fatty twin-tail triamines. Furthermore, the present invention relates to the production of diamines obtained from internal ketones. These diamines may be used in the method for producing twin-tail triamines according to the invention. Finally, the invention relates to a new aldehyde compound, which is an intermediate product of the method for producing twin-tail triamines of the invention.

18 Claims, No Drawings

PROCESS FOR THE SYNTHESIS OF TWIN-TAIL TRIAMINES

TECHNICAL FIELD

The invention relates to a new method for producing twin-tail triamines, preferably fatty twin-tail triamines. Furthermore, the present invention relates to the production of diamines obtained from internal ketones. These diamines may be used in the method for producing twin-tail triamines according to the invention. Finally, the invention relates to a new aldehyde compound, which is an intermediate product of the method for producing twin-tail triamines of the invention.

TECHNICAL BACKGROUND

Twin-tail triamines, in particular fatty twin-tail triamines, are used in the production of zwitterionic derivatives such as for example betaine, amine-oxide or sultaines, which are of interest for different applications, for example drift reduction of pesticide formulations, surfactant flooding for enhanced oil recovery, acidizing for O & G stimulation etc.

In the state of the art those di- and triamine compounds can be obtained by reductive amination of aldehydes and ketones with di- or triamine reactants containing at least one primary or secondary amine group. In the case of reductive aminations between sterically hindered ketones and secondary amine containing di- or triamines, the reductive amination may require the aid of a Lewis acid co-reactant either in a catalytic amount such as for example described in WO 2007/104357 or WO 2007/104359 or in stoichiometric or even excess amounts.

WO 2017/174417 or WO 2017/174424 refers to a catalytic reductive amination from internal ketones to obtain diamines and zwitterionic derivatives thereof, which are suitable for producing fatty twin-tail triamines. In the examples of those patent applications, the reductive aminations are carried out using hydride reactants ($NaBH_4$) as the reducing agents and Lewis acid as the co-reactant ($Ti(OiPr)_4$).

However, the use of a Lewis acid in such reactions precludes any industrialization of these production methods.

JP 2014118385 describes a reductive amination of an aldehyde for producing an aliphatic tertiary amine by using preferably a palladium catalyst wherein the reductive amination is not induced by a Lewis acid. However, according to the teaching of this application, only small molecules, i.e. aliphatic aldehydes having 2 to 10 atoms can be transferred to diamines and/or triamines.

WO 2018/087188 describes a direct synthetic route for the access toward intermediate twin-tail triamines from internal ketones, namely reductive amination with 3,3'-iminobis(N,N-dimethylpropylamine) However, the reductive amination is not operating under standard conditions and requires the use of Lewis acids in stoichiometric or even excess amounts.

Hence, a cheaper production process that can be industrialized for the access toward twin-tail triamines, in particular fatty twin-tail triamines, is highly desirable.

SUMMARY OF THE INVENTION

The invention consequently relates to a method for producing a twin-tail triamine having the formula (I)

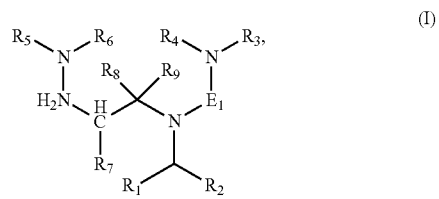

characterized in that in a first method step a diamine having the formula (II)

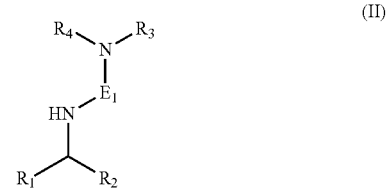

is reacted with an aldehyde having the formula (III)

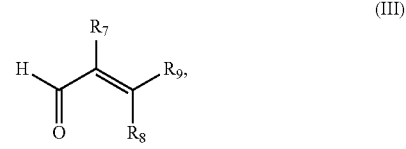

to obtain an aldehyde having the formula (IV)

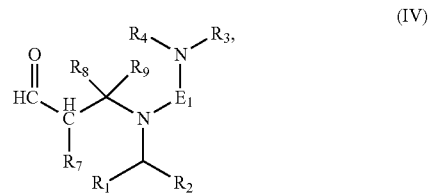

which is further reacted, in a second method step, with an amine having the formula (V)

under reductive amination conditions to obtain the twin-tail triamine according to formula (I), wherein:
$R_1$ and $R_2$ of the compounds of the invention independently represent a $C_3$-$C_{27}$ aliphatic group,
$R_3$ and $R_4$ either independently represent a $C_1$-$C_8$ alkyl group, or are linked together to form a ring of formula

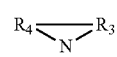

wherein $R_4$—$R_3$ represents a divalent hydrocarbon radical containing from 2 to 10 carbon atoms (for example —$(CH_2)_4$— or —$(CH_2)_5$—), $R_5$ and $R_6$ either independently represent a $C_1$-$C_8$ alkyl group, or are linked together to form a ring of formula

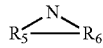

wherein $R_5$-$R_6$ represents a divalent hydrocarbon radical containing from 2 to 10 carbon atoms (for example —$(CH_2)_4$— or —$(CH_2)_5$—), $R_7$, $R_8$ and $R_9$ independently represent hydrogen or a $C_1$-$C_8$ alkyl group, and $E_1$ represents a linear or branched divalent hydrocarbon radical with 2 to 24 carbon atoms, which can be optionally substituted and/or interrupted by one or more heteroatom containing groups.

Preferably, the first and second method step of the above-described method is carried out in a "one-pot" sequence.

Furthermore, the invention provides a method for producing a diamine, which may be used in the production of the twin-tail triamine according to the invention. This diamine has the formula (II)

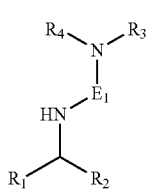

and is produced such that a ketone having the formula (VII)

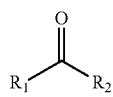

is reacted with a diamine having the formula (VIII)

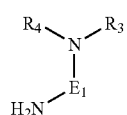

under reductive amination conditions by using a transition metal based catalyst, such as for example a noble metal, supported on a carrier, at a temperature from 50 to 250° C. and under hydrogen pressure from 2 to 100 bar, wherein the reductive amination is not induced by a Lewis acid, and wherein the definitions of $R_1$, $R_2$, $R_3$, $R_4$ and $E_1$ are in accordance with the definitions as given with respect to $R_1$, $R_2$, $R_3$, $R_4$ and $E_1$ of the twin-tail triamine according to the invention.

Furthermore, the invention provides a new compound, an aldehyde, having the formula (IV).

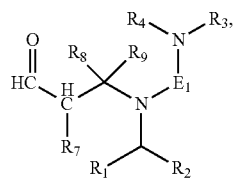

wherein the definitions of $R_1$, $R_2$, $R_3$, $R_4$, $R_7$, $R_8$, $R_9$ and $E_1$ are in accordance with the definitions as given with respect to $R_1$, $R_2$, $R_3$, $R_4$, $R_7$, $R_8$, $R_9$ and $E_1$ of the twin-tail triamine according to the invention.

The aldehyde of formula (IV) is an intermediate product of the method for producing a twin-tail triamine of the invention.

It has been surprisingly found that by using the production methods of the invention the yield of the obtained diamines and twin-tail triamines can be increased. In particular, the yield of the twin-tail triamine can be increased if the diamine of formula (II) used in twin-tail triamines production method of the invention is produced by the method of the invention as described herein. The best result can be achieved, if the production method for the twin-tail triamine starts from an internal ketone and follows the three steps pathway as described herein, wherein the last two steps can be executed in a "one-pot" sequence.

Additionally, by using the production methods of the invention the amount of waste or undesired side-products generated during the production process of a diamine and/or triamine can be limited and the production costs are low, because in the methods of the invention only cheap raw materials are used.

Furthermore, the zwitterionic derivatives such as betaine, amine-oxide or sultaine that are obtained from the twin-tail triamines produced according to the method of the invention display remarkable properties, e.g. viscos-elastic properties in water already detectable at very low concentrations, very low interfacial tensions with crude oil etc.

DETAILED DESCRIPTION OF THE INVENTION

Before the issues of the invention are described in detail, the following should be considered:

As used herein, the singular forms "a", "an", and "the" include both singular and plural referents unless the context clearly dictates otherwise. By way of example, "a compound" means one compound or more than one compound.

The terms "comprising", "comprises" and "comprised of" as used herein are synonymous with "including", "includes" or "containing", "contains", are inclusive and do not exclude additional, non-recited members, elements or method steps. It will be appreciated that the terms "comprising", "comprises" and "comprised of" as used herein comprise the terms "consisting of", "consists" and "consists of".

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different alternatives, embodiments and variants of the invention are defined in more detail. Each alternative and embodiment so defined may be combined with any other alternative and embodiment, and this for each variant unless clearly indicated to the contrary or clearly incompatible when the value range of a same parameter is disjoined. In particular, any feature indicated as being preferred or advantageous may be combined with any other feature or features indicated as being preferred or advantageous.

Furthermore, the particular features, structures or characteristics described in the present description may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As mentioned above, the method of the invention for producing a twin-tail triamine of formula (I), in particular a fatty twin-tail triamine,

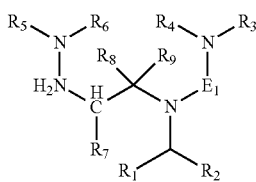
(I)

is characterized in that in a first method step a diamine having the formula (II)

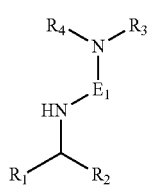
(II)

is reacted with an aldehyde having the formula (III)

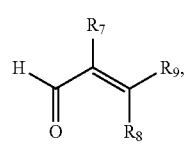
(III)

to obtain an aldehyde as intermediate compound having the formula (IV)

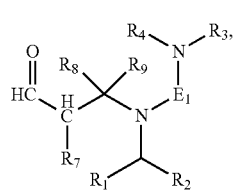
(IV)

wherein
$R_1$ and $R_2$ of the compounds independently represent a $C_3$-$C_{27}$ aliphatic group,
$R_3$ and $R_4$ either independently represent a $C_1$-$C_8$ alkyl group, or are linked together to form a ring of formula

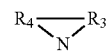

wherein $R_4$—$R_3$ represents a divalent hydrocarbon radical containing from 2 to 10 carbon atoms (for example —$(CH_2)_4$— or —$(CH_2)_5$—),
$R_5$ and $R_6$ either independently represent a $C_1$-$C_8$ alkyl group, or are linked together to form a ring of formula

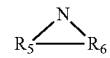

wherein $R_5$-$R_6$ represents a divalent hydrocarbon radical containing from 2 to 10 carbon atoms (for example —$(CH_2)_4$— or —$(CH_2)_5$—),
$R_7$, $R_8$ and $R_9$ independently represent hydrogen or a $C_1$-$C_8$ alkyl group, and
$E_1$ of the compounds represents a linear or branched divalent hydrocarbon radical with 2 to 24 carbon atoms, which can be optionally substituted and/or interrupted by one or more heteroatom containing groups.

As mentioned above, $R_1$ and $R_2$ of the compounds of the invention independently represent a $C_3$-$C_{27}$ aliphatic group, preferably a $C_3$-$C_{19}$ aliphatic group, more preferably a $C_7$-$C_{17}$ aliphatic group, even more preferably a $C_{11}$-$C_{15}$ aliphatic group.

The number of carbon atoms of $R_1$ and $R_2$ can be even or odd numbers. $R_1$ and $R_2$ may be identical to each other or, alternatively, $R_1$ and $R_2$ may differ from each other.

The number of carbon atoms of $R_1$ ($n_{R1}$) and the number of carbon atoms of $R_2$ ($n_{R2}$) as herein represented by the couple ($n_{R1}$, $n_{R2}$) can be notably any of the following couples:

(3,3), (5,5), (7,7), (9,9), (11,11), (13,13), (15,15), (17,17), (19,19), (21,21), (23,23), (25,25), (27,27),
(7,9), (7,11), (7,13), (7,15), (7,17), (7,19), (7,21), (7,23), (7,25), (7, 27),
(9,11), (9,13), (9,15), (9,17), (9,19), (9,21), (9,23), (9,25), (9,27),
(11,13), (11, 15), (11,17), (11,19), (11, 21), (11,23), (11, 25), (11,27),
(13,15), (13,17), (13,19), (13,21), (13,23), (13,27),
(15,17), (15,19), (15,21), (15,23), (15,25), (15,27),
(19,21), (19,23), (19,25), (19,27),
(21,23), (21,25), (21,27),
(23,25), (23,27) or
(25,27).

The aliphatic groups $R_1$ and $R_2$ may be linear or branched and may be free of any double bond and of any triple bond. Alternatively, the aliphatic groups $R_1$ and $R_2$ may comprise at least one —C=C— double bond and/or at least one —C≡C— triple bond.

The aliphatic groups $R_1$ and $R_2$ are advantageously chosen from alkyl groups, alkenyl groups, alkanedienyl groups, alkanetrienyl groups and alkynyl groups.

Preferably, the aliphatic groups $R_1$ and $R_2$ are independently chosen from alkyl and alkenyl groups.

More preferably, the aliphatic groups $R_1$ and $R_2$ are independently chosen from alkyl and alkenyl groups, generally from $C_3$-$C_{27}$ alkyl and $C_3$-$C_{27}$ alkenyl groups, very often from $C_3$-$C_{19}$ alkyl and $C_3$-$C_{19}$ alkenyl groups and often from (i) $C_6$-$C_{17}$ alkyl and $C_6$-$C_{17}$ alkenyl groups of from (ii) $C_7$-$C_{17}$ alkyl and $C_7$-$C_{17}$ alkenyl groups. More preferably, $R_1$ and $R_2$ independently represent an alkyl group, generally a $C_3$-$C_{27}$ alkyl group, very often a $C_3$-$C_{19}$ alkyl group, often a $C_6$-$C_{17}$ alkyl group or a $C_7$-$C_{17}$ alkyl group.

When $R_3$ and $R_4$ represent a $C_1$-$C_8$ alkyl group, this one may be linear or branched. When $R_3$ and $R_4$ represent a $C_1$-$C_8$ alkyl group, $R_3$ and $R_4$ are preferably a $C_1$-$C_6$ alkyl group which may be linear or branched, and are more preferably methyl.

When $R_3$ and $R_4$ are linked together to form a ring of formula

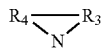

wherein $R_4$—$R_3$ represents a divalent hydrocarbon radical containing from 2 to 10 carbon atoms, divalent hydrocarbon radical $R_4$—$R_3$ contains preferably from 3 to 8 carbon; more preferably, $R_4$—$R_3$ is of formula —$(CH_2)_m$— where m is an integer ranging from 4 to 6.

$R_7$, $R_8$ and $R_9$ independently represent hydrogen or a $C_1$-$C_8$ alkyl group.

$E_1$ represents a linear or branched divalent hydrocarbon radical with 2 to 24 carbon atoms, which can be optionally substituted and/or interrupted by one or more heteroatom containing groups. It is preferred that $E_1$ of the compounds of the present invention represents a (—$CH_2$—)$_m$ group, wherein m is an integer equal to 2 or from 3 to 20. In a preferred embodiment, $E_1$ is —$(CH_2)_3$—.

In another embodiment of the invention, $R_7$, $R_8$ and $R_9$ are hydrogen.

In another embodiment of the invention, $E_1$ is (—$CH_2$—)$_m$ with m being an integer equal to 2 or from 3 to 20, $R_7$, $R_8$ and $R_9$ are hydrogen, and $R_3$ and $R_4$ are an alkyl group with 1 to 6 atoms.

In a further preferred embodiment of the invention, $E_1$ is —$(CH_2)_3$—, $R_7$, $R_8$ and $R_9$ are hydrogen, and $R_3$ and $R_4$ are methyl.

According to the invention, the diamine having the formula (II) as defined above reacts with an aldehyde having the formula (III)

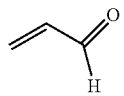 (III)

wherein $R_7$, $R_8$ and $R_9$ independently represent hydrogen or a $C_1$-$C_8$ alkyl group.

Preferably, the aldehyde of formula (III) is an aldehyde selected from the group consisting of

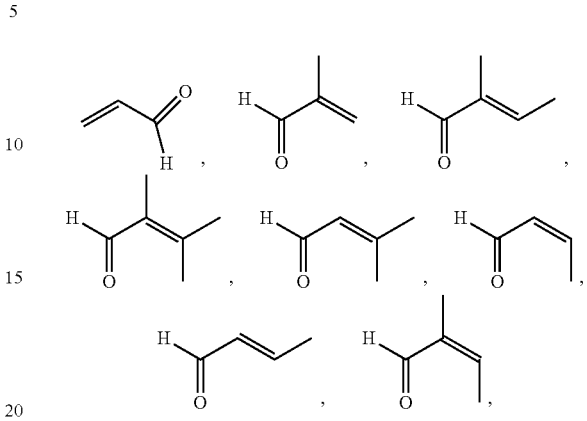

and mixtures thereof.

Even more preferred, the aldehyde is acrolein

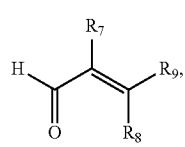

(also indicated as propenal).

According to the invention it is preferred that if 1 equivalent of the diamine of formula (II) is used at least 1.1 up to 5 equivalents, preferably 1.5 to 4 equivalents, more preferably 2 to 3 equivalents of the aldehyde of formula (III) is used in the first method step.

It is further preferred that the reaction of the diamine of formula (II) and the aldehyde of formula (III) is carried out in the presence of a catalyst. The catalyst is preferably chosen from amine compounds free of any primary amine group and any secondary amine group and amidine compounds free of any primary amine group and any secondary amine group. Among amine compounds free of any primary amine group and any secondary amine group, it is worth citing tertiary amines such as 1,4-diazabicyclo[2.2.2]octane (DABCO), methylmorpholine and triethanolamine on one hand, and aromatic amines such as pyridine, 4-dimethylaminopyridine and picoline on the other hand. Among amidine compounds free of any primary amine group and any secondary amine group, it is worth citing cyclic amidines such as diazabicyclo[5.4.0]undec-7-ene (DBU) and 1,5-diazabicyclo[4.3.0]non-5-ene (DBN). As demonstrated in the examples, the use of an amine or amidine compound free of any primary amine group and of any secondary amine group results in an increase of the yield of the produced aldehyde of formula (IV) and thus to an increase of the yield of the target twin-tail triamine.

It is preferred that the molar ratio of the diamine of formula (II) and the additional amine compound is from 1:0.1 to 1:0.5; more preferably from 1:0.2 to 1:0.4.

It is further preferred that the reaction of the first method step is carried at a temperature from −15 to 30° C., more preferably from −10 to 25° C., even more preferred the reaction is carried out at room temperature.

The reaction time of the first method step of the invention as described above is preferably from 5 minutes to 3 hours, more preferably from 5 to 60 minutes or from 5 to 30 minutes, even more preferred from 10 to 20 minutes.

Additionally, it is preferred that the first method step of the invention is carried out in the presence of an organic solvent. The organic solvent is preferably selected the group consisting of methanol, ethanol, isopropanol, tert-butanol, tetrahydrofuran (THF), 2-methyltetrahydrofuran, diethyl ether, methyl tert-butyl ether (MTBE), 1,4-dioxane, dimethoxyethane, diglyme and mixtures thereof; preferably the solvent is THF.

The organic solvent is used in an amount that is sufficient to carry out the reaction in the liquid phase.

Additionally it is preferred that the first method step of the invention is carried out by performing a progressive addition of the aldehyde (III) or its solution in a preferred solvent selected from the list as mentioned above to the diamine of formula (II) optionally dissolved in a preferred solvent selected from the list above and optionally combined with an additional amine compound as mentioned above. Progressive addition of the aldehyde to the diamine means that the aldehyde is added to the diamine continuously during a given time period. The time period for the progressive addition of the aldehyde to the diamine can vary in the range of 5 minutes to 3 hours, preferable from 5 minutes to 1 hour, more preferably from 10 minutes to 30 minutes.

According to the invention, in a second method step under reductive amination conditions the obtained intermediate product of formula (IV) further reacts with an amine having the formula (V)

(V)

wherein $R_5$ and $R_6$ either independently represent a $C_1$-$C_8$ alkyl group, or are linked together to form a ring of formula

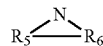

wherein $R_5$-$R_6$ represents a divalent hydrocarbon radical containing from 2 to 10 carbon atoms (for example —$(CH_2)_4$—, —$(CH_2)_5$— etc.). In a specific embodiment, it is preferred that $R_5$ and $R_6$ are methyl.

Further definitions of $R_5$ and $R_6$ correspond to the definitions of $R_3$ and $R_4$ as given above, whereby $R_3$, $R_4$, $R_5$ and $R_6$ may be the same or different at each occurrence of the compounds of the invention.

In a preferred embodiment, the amine of formula (V) is selected from the group consisting of dimethylamine, diethylamine, dipropylamine, dibutylamine, pyrrolidine, piperidine and mixtures thereof. Preferably, the amine of formula (V) is dimethyl amine.

Furthermore, it is preferred that the reductive amination reaction is carried out in the presence of a transition metal based catalyst supported on a carrier.

A transition metal in the meaning of the invention is a metal according to IUPAC definition, i.e. an element whose atom has a partially filled d sub-shell, or which can give rise to cations with an incomplete d sub-shell, for example elements of groups 4 to 11 of the periodic system, or scandium and yttrium; or a transition metal in the meaning of the invention is a metal selected from the group consisting of elements in the d-block of the periodic system, which includes groups 3 to 12 of the periodic system; and/or is a metal selected from the f-block lanthanide and actinide series of the periodic system.

According to the invention, it is even more preferred that the metal is a noble metal, preferably selected from the group consisting of Pd, Pt, Rh and Ru and mixture thereof. In a most preferred embodiment of the invention, the metal of the noble metal based catalyst is Pt.

Additionally, it is preferred that the carrier of the transition metal based catalyst is selected from the group consisting of carbon, silica, alumina, titania, zirconia, magnesia, ceria, zeolite and diatomaceous earth. Preferably, the carrier is carbon. More preferably, the carrier is activated carbon. The shape of the carrier is not particularly limited and can be for example a powder, a crushed shape, a pellet, a bead, a fiber shape or a honeycomb shape.

It is preferred that the transition metal based catalyst as described above is used in the reductive amination reaction of the aldehyde of formula (IV) with the amine of formula (V) in amount of 0.1 to 10 wt.-%, preferably 1 to 8 wt.-% or 2.5 to 7 wt.-%, more preferably 3 to 6 wt.-%, even more preferred in an amount of 5 wt.-% based on the total amount of aldehyde of formula (IV), amine of formula (V) and transition metal based catalyst supported on a carrier.

The reductive amination of the second method step of the invention can be carried out with 1 equivalent of amine (V) with respect to the aldehyde (IV) or alternatively an excess of amine (V) can be employed. For example in case 1 equivalent of aldehyde (IV) is used, 1.5 to 20 equivalents, more preferably 2 to 10 equivalents, even more preferred 3 to 8 equivalents of the amine of formula (V) is used. If the amine (V) is used in excess amount, the amine can be separated at the end of the reaction and optionally recycled.

Furthermore, it is preferred that the reductive amination of the aldehyde of formula (IV) is carried out at a temperature from 10 to 100° C., preferably from 15 to 70° C., more preferably at a temperature from 20 to 50° C., even more preferred at room temperature, and that the hydrogen pressure is from 2 to 100 bar, preferably from 10 to 80 bar or from 20 to 70 bar, more preferably from 40 to 60 bar. In a specific embodiment of the invention, the reaction is carried out at from 10 to 40° C. and a hydrogen pressure from 40 to 60 bar or even more preferred at room temperature (typically from about 15° C. to about 25° C.) and at a hydrogen pressure of about 50 bar.

Additionally, it is preferred that the reaction time of the second method step is from 1 to 15 hours, more preferably from 2 to 12 hours or from 2 to 10 hours, more preferably from 2 to 5 hours.

According to the invention, it is preferred that the hydrogen used in the methods of the invention is molecular $H_2$, which is introduced to reductive amination reactions of the invention from an external source. However, it is also possible that the hydrogen is in situ generated from a hydrogen-containing compound such as for example selected from a group consisting of ammonia, hydrazine, ammonia borane, sodium hydride, calcium hydride, lithium hydride, lithium aluminum hydride, formic acid or its salts and sodium borohydride.

Furthermore, it is preferred that the second method step for producing the twin-tail triamine of formula (I) is carried out in the presence of an organic solvent. The organic solvent is preferably selected the group consisting of methanol, ethanol, isopropanol, tert-butanol, tetrahydrofuran, 2-methyl-tetrahydrofuran, 1,4-dioxane, dimethoxyethane, diglyme and mixtures thereof, preferably the solvent is THF.

It is further preferred that the organic solvent used in the second method step is the same organic solvent as used in the first method step.

Additionally it is preferred, that the reaction is conducted batchwise, semi-continuously or continuously and generally either in a batch more of in a continuous mode using a fixed-bed catalyst (gas-solid or gas-liquid-solid process).

The above-mentioned two method steps of the method for producing a twin-tail triamine according to the invention may be carried out such that after the first method step the obtained intermediate aldehyde is isolated from the organic solvent used in the reaction and purified by suitable purification methods known in the art. However, it is more preferred that the reaction solution of the first method step is transferred to a reactor suitable for carrying out the second method step under hydrogen pressure, for example a stainless autoclave, without isolating the intermediate aldehyde of formula (IV), i.e. the two methods steps are carried out in a "one-pot" sequence. In the last case no further organic solvent is added to the second method step.

Furthermore, the obtained twin-tail triamine of formula (I) can be further reacted with a compound having the following formula (VI)

wherein Y—$R_O$ represents either hydrogen peroxide or a compound in which Y is a leaving group and $R_O$ is -Alk-CH(OH)—$CH_2$—$SO_3$M or -Alk-$CO_2$M, wherein Alk represents an alkanediyl group and M is an alkaline metal or hydrogen to obtain a twin-tail amine zwitterionic derivative having the following formula (Ia),

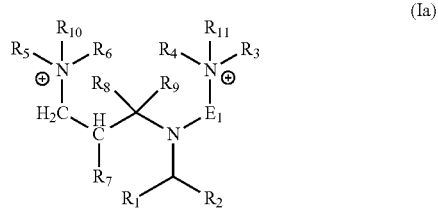

wherein $R_1$, $R_2$, $R_3$, $R_4$, $R_5$, $R_6$, $R_7$, $R_8$, $R_9$ and $E_1$ are defined as described above and $R_{10}$ and $R_{11}$, which may be the same or different at each occurrence of the compound, represent a group selected from —O—, -Alk-CH(OH)—$CH_2$—$SO_3^-$ and -Alk-$CO_2^-$ wherein Alk represents an alkanediyl group.

The reaction conditions and the obtained zwitterionic derivatives of the twin-tail triamines are in particular described at paragraphs [00244] to [00269] of the International application WO 2018/087188.

The diamine of formula (II) used in the method for producing the twin-tail triamine of formula (I) according to the invention can be produced by any method known in the art, as for example described in WO 2017/174417 or WO 2017/174424.

However, according to the invention, in order to provide a further improved method for producing the twin-tail triamine of formula (I), it is preferred that the diamine of formula (II) is produced by the method as described below.

In this method an internal ketone having the formula (VII)

is reacted with a diamine having the formula (VIII)

under reductive amination conditions in the presence of a transition metal based catalyst supported on a carrier, at a temperature from 50 to 250° C. under hydrogen pressure from 2 to 100 bar without the use of a Lewis acid. The definitions of groups $R_1$, $R_2$, $R_3$, $R_4$ and $E_1$ of the compounds corresponds to the definitions of the groups $R_1$, $R_2$, $R_3$, $R_4$ and $E_1$ of the compounds as given above and the meaning of the term "transition metal" is in accordance with the definition as given above.

It is preferred that in this method the transition metal of the catalyst is a noble metal. Furthermore, it is preferred that the noble metal is selected from the group consisting of Pd, Pt, Rh and Ru and mixture thereof, more preferably the metal is Pt.

Additionally it is preferred that the carrier is selected from group consisting of carbon, silica, alumina, titania, zirconia, magnesia, ceria, zeolite and diatomaceous earth, more preferably the carrier is carbon. Even more preferred is that the carrier is activated carbon. The shape of the carrier is not particularly limited and can be for example a powder, a crushed shape, a pellet, a bead, a fiber shape or a honeycomb shape.

It is preferred that the transition metal based catalyst as described above is used in the reductive amination reaction of the internal ketone of formula (VII) with the diamine of formula (VIII) in an amount of 0.1 to 10 wt.-%, preferably 1 to 8 wt.-% or 2.5 to 7 wt.-%, more preferably 3 to 6 wt.-%, even more preferred in an amount of 5 wt.-% based on the total amount of internal ketone of formula (VII), diamine of formula (VIII) and transition metal based catalyst supported on a carrier.

Additionally, in accordance with the method for producing a twin-tail triamine of the invention as described above, it is preferred that the hydrogen used in the method for producing a diamine of formula (II) is molecular $H_2$ obtained from an external source.

Furthermore, according to the teaching of the invention, due to the reductive amination conditions used in the invention, the use of Lewis acid for inducing the reductive amination reaction can be excluded. Typical Lewis acids used in in the prior art are for example metal halogenide, for example $AlCl_3$, $TiCl_4$, $SnCl_4$ or $CeCl_3$; metal alkoxide, in particular metal isopropoxide or metal methoxide or metal ethoxide; composites of a metal and a ligand with at least one carboxylic acid group such as for example metal acetate, metal acetylacetonate; or metal dialkoxide, metal diamide, metal amide alkoxides, metal alkoxides phosphine, metal amide phosphine or metal amino phosphine.

Additionally, it is preferred that the method for producing a diamine of formula (II) of the invention is carried out at a temperature from 70 to 150° C., more preferably from 80 to 140° C.

The hydrogen pressure used in the method is preferably in the range of 15 to 90 bar, 20 to 80 bar, more preferably in the range of 25 to 50 bar.

In a specific embodiment of the invention, the hydrogen pressure is 40 bar and the temperature is 120° C.

The reaction time of the method for producing a diamine of formula (II) of the invention is preferably from 1 to 24 hours, more preferably from 5 to 15 hours or from 8 to 12 hours, even more preferred from 10 to 12 hours.

Furthermore, according to the invention, it is preferred that the reductive amination reaction as described above is carried out in the presence of an organic solvent.

The organic solvent is preferably selected from the group consisting of an aliphatic hydrocarbon having 5 to 10 carbon atoms, an aliphatic alcohol having 1 to 10 carbon atoms, an aromatic hydrocarbon having 6 to 20 carbon atoms, an oxygen-contain hydrocarbon having 4 to 10 carbon atoms, a nitrogen-containing hydrocarbon having 4 to 10 atoms, oxygen-containing aromatic hydrocarbon having 6 to 20 carbon atoms, nitrogen-containing aromatic hydrocarbon having 6 to 20 carbon atoms and mixtures thereof.

Preferably, the organic solvent is an aliphatic alcohol having 1 to 10 carbon atoms, preferably 1 to 4 carbon atoms, more preferably the organic solvent is ethanol.

The organic solvent is used in an amount that is sufficient to carry out the reaction in the liquid phase.

Furthermore, it is preferred, that the catalytic reductive amination reaction is conducted batchwise, semi-continuously or continuously and generally either in a batch more of in a continuous mode using a fixed-bed catalyst (gas-solid or gas-liquid-solid process).

The internal ketone of formula (VII) used in the method for producing the diamine of formula (II) of the invention can be produced by any method known in the prior art as for example described in WO 2017/174417 or in WO 2018/087188.

The diamine of formula (VIII) is preferably selected from the group consisting of aminoethylethanolamine (AEEA), ethylenediamine (EDA), dimethylaminopropylamine (DMAPA), and mixtures thereof. In a preferred embodiment the diamine of formula (VIII) is DMAPA.

According to a specific embodiment, the group $E_1$ of the diamine of formula (VIII) may comprise an amine group (in that case, the amine may be a triamine or a polyamine the term "diamine" as used in the reductive amination as described above intend to encompass compounds including at least two amine groups, and optionally more). Examples of amines with more than two amine groups include for example diethylene triamine (DETA), triethylene tetramine (TETA), tetraethylene pentamine (TEPA).

Mixtures of diamines may also be used, including for example mixture of DETA/EDA/AEEA.

The diamine of formula (II) produced by the method as described above can be recovered after catalyst separation and removal of solvent and diamine of formula (VIII) in excess. Finally, the product can be purified using e.g. standard technics such as distillation and may be used in the method for the production of twin-tail triamine of formula (I) of the invention. It is also possible to use the obtained product further without purification.

It is preferred that in case 1 equivalent of the internal ketone of formula (VII) is used in the reaction, 1.5 to 5 equivalents, more preferably 2 to 4 equivalents, even more preferred 2.5 to 3 equivalents of the diamine of formula (VIII) is used.

The method for producing a diamine of formula (II) according to the invention affords yields of the target diamine of higher than 90%, preferably higher than 95%, more preferably higher than 98%.

In a preferred embodiment of the invention, in the method for production of a twin-tail triamine, a diamine of formula (II) is used in that the diamine is produced by using the method for producing a diamine of formula (II) as described above.

In a specific embodiment of the invention, the twin-tail triamine is produced according to the following reaction scheme:

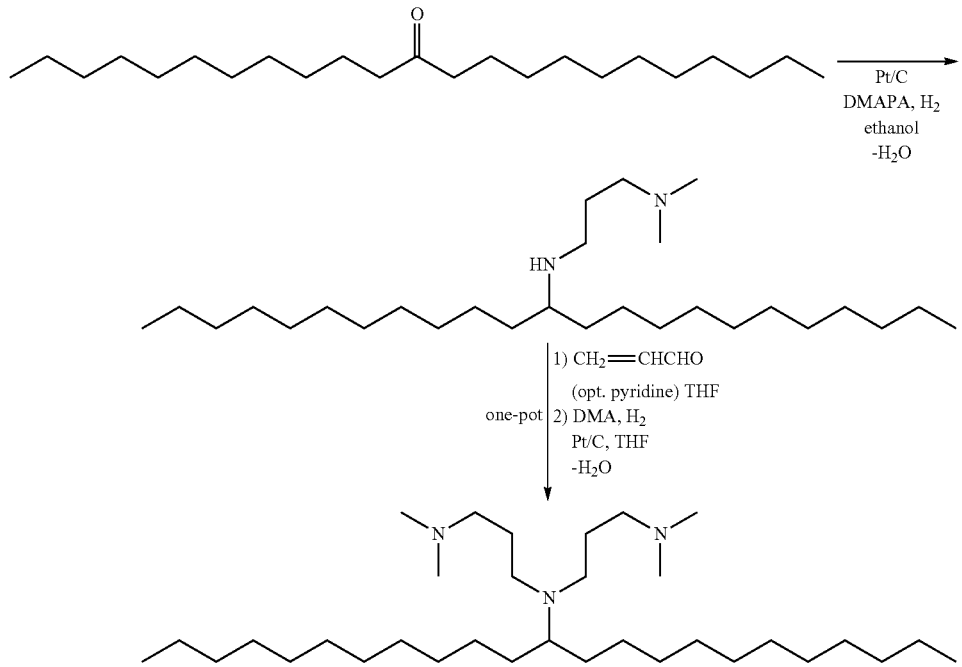

The method for producing the twin-tail triamine of the invention affords yields of the desired target triamine of higher than 50%, higher than 55%, preferably of 60% or higher starting from the internal ketone.

The examples that follow are intended for illustrating the invention in more detail.

EXAMPLES

Example 1

Reductive Amination of 12-tricosanone with DMAPA (3-dimethylaminopropylamine) to Produce a Diamine of Formula (II)

30 g of 12-tricosanone (89 mmol), 20 g of DMAPA (196 mmol), 0.9 g of 5 wt % Pt/C and 70 g of ethanol were added into a 300 mL stainless-steel autoclave. The autoclave was closed, flushed with nitrogen three times and then charged with 50 bar of hydrogen. The mixture was then heated under stirring at 120° C. and maintained at the same temperature for 12 hours. After cooling to room temperature and releasing the pressure, the reaction mixture was filtered and then evaporated under reduced pressure on a rotary evaporator to remove the solvent and unreacted DMAPA. The remaining liquid was analyzed by GC.

The analysis showed a conversion of 12-tricosanone of 99.9%, and the selectivity to the intermediate amine was 99.5%.

In comparison the yield of the synthesis from $C_{23}$-tricosanone (internal ketone form a C12 acid) as described in WO 2017/174417, Example 1.2.1, was only 48%.

Thus, Example 1 demonstrates that by using the reaction conditions as taught by the invention the yield of the desired product can be increased.

Example 2

Conjugate Addition between Acrolein (1.7 eq.) and the Intermediate Amine Obtained in Example 1 in the Presence of Pyridine as the Catalyst to Obtain a Compound of Formula (IV)

The first solution was prepared by adding 1.5 g of the intermediate amine (3.5 mmol) and 0.15 mL pyridine (147 mg, 1.9 mmol, 0.5 eq.) into 3 mL of THF. Then 0.4 mL of acrolein (320 mg, 5.7 mmol) in 3 mL THF was added to the first solution slowly at room temperature. $^1$H NMR was measured after 10 minutes, showing a yield to the intermediate aldehyde of 77%. After 1 hour, $^1$H NMR was measured again, showing a yield to the intermediate aldehyde of 71%.

Example 3

Conjugate Addition between Acrolein (4.3 eq.) and the Intermediate Amine Obtained in Example 1 in the Presence of Pyridine as the Catalyst to Obtain an Aldehyde of Formula (IV)

The first solution was prepared by adding 1.5 g of the intermediate amine (3.5 mmol) and 0.15 mL pyridine (147 mg, 1.9 mmol, 0.5 eq.) into 3 mL of THF. Then 1.0 mL of acrolein (839 mg, 15 mmol) in 3 mL THF was added to the first solution slowly at room temperature. $^1$H NMR was measured after 10 minutes, showing a yield to the intermediate aldehyde of 93%. After 1 hour, $^1$H NMR was measured again, showing a yield to the intermediate aldehyde of 83%.

Example 4

Conjugate Addition between Acrolein (2.1 eq.) and the Intermediate Amine Obtained in Example 1 in the Absence of Pyridine to Obtain an Aldehyde of Formula (IV)

The first solution was prepared by adding 1.5 g of the intermediate amine (3.5 mmol) into 3 mL of THF. Then 0.5 mL acrolein (420 mg, 7.5 mmol) in 3 mL THF was added to the first solution slowly at room temperature. $^1$H NMR was measured after 1 hour, showing a yield to the intermediate aldehyde of 76%.

Example 5

Conjugate Addition between Acrolein and the Intermediate Amine Obtained in Example 1 in the Presence of DBU to Obtain an Aldehyde of Formula (IV)

The first solution was prepared by adding 0.5 g of the intermediate amine (1.2 mmol) and 20 uL of DBU (20.4 mg, 0.134 mmol) into 5 mL of THF. The first solution was then cooled to −10° C. in an ice/salt bath. Then 100 uL acrolein (80 mg, 1.43 mmol) was added to the first solution and stirred for 1 hour. $^1$H NMR showed a yield to the intermediate aldehyde of 80%.

Example 6

Synthesis of Twin-Tail Triamine of Formula (I) from the Amine Intermediate Obtained in Example 1 (DBU as Amine Compound)

$1^{st}$ step: 0.5 gram of the amine intermediate (1.2 mmol) and 20 uL of DBU (20.4 mg, 0.134 mmol) were added to 3 mL of THF in a 25 mL flask and cooled with iced water. Then 0.2 mL of acrolein (160 mg, 2.9 mmol) in 3 mL THF was added into the first solution and stirred for 10 minutes.

$2^{nd}$ step: 3 mL of the solution from the $1^{st}$ step was transferred into a stainless autoclave containing 20 mg of 5% Pt/C catalyst. The autoclave was closed, charged with 0.8 g of dimethylamine (17.5 mmol) and 40 bar hydrogen. The autoclave was heated from room temperature to 60° C. in 2 hours and held at 60° C. for 1 hour. After cooling to room temperature, the autoclave was vented slowly and the reaction mixture was filtered and analyzed by GC.

The yield to the target twin-tail triamine was 67%.

Example 7

Synthesis of Twin-Tail Triamine of Formula (I) from the Amine Intermediate Obtained in Example 1 (without DBU or pyridine as Amine Compound)

$1^{st}$ step: The first solution was prepared by adding 6.0 gram of the amine intermediate (14.13 mmol) to 12 mL of THF at room temperature. Then 2.0 mL of acrolein (1.68 g, 30 mmol) in 12 mL THF was added into the first solution and stirred for 10 minutes.

$2^{nd}$ step: The solution from the $1^{st}$ step was transferred into a stainless autoclave with 480 mg of 5% Pt/C catalyst. The autoclave was closed, charged with 3.8 g of dimethylamine (84 mmol) and 40 bar hydrogen. The autoclave was kept at room temperature under stirring for 12 hours. After reaction, the autoclave was vented slowly and the reaction mixture was filtered and analyzed by GC.

The yield to the target twin tail triamine was 60%.

Comparative Example 1

Synthesis of Twin-Tail Triamine from the Direct Reductive Amination of 12-tricosanone with 3,3'-iminobis(N,N-dimethylpropylamine)

0.1 g of 12-tricosanone (0.3 mmol), 0.1 g of 3,3'-iminobis (N,N-dimethylpropylamine) (0.5 mmol), 10 mg of 5wt % Pt/C and 3 mL of ethanol were added into a 30 mL stainless-steel autoclave. The autoclave was closed, flushed with nitrogen three times and then charged with 40 bar of hydrogen. The mixture was then heated under stirring at 120° C. and maintained at the same temperature for 4 hours. After cooling to room temperature and the pressure was released slowly, the reaction mixture was filtered and analyzed by GC.

The analysis showed a conversion of 12-tricosanone of 8%, and the selectivity to the triamine was 5%.

Comparative Example 2

Synthesis of Twin-Tail Triamine from the Reductive Amination of 12-tricosanone with 3,3'-iminobis(N,N-dimethylpropylamine)

0.1 g of 12-tricosanone (0.3 mmol), 0.5 g of 3,3'-iminobis (N,N-dimethylpropylamine) (2.5 mmol), 20 mg of 5wt % Pt/C and 3 mL of ethanol were added into a 30 mL stainless-steel autoclave. The autoclave was closed, flushed with nitrogen three times and then charged with 40 bar of hydrogen. The mixture was then heated under stirring at 160° C. and maintained at the same temperature for 4 hours. After cooling to room temperature and the pressure was released slowly, the reaction mixture was filtered and analyzed by GC.

The analysis showed a conversion of 12-tricosanone of 60%, and the selectivity to the triamine was 5%.

The invention claimed is:

1. A method for producing a twin-tail triamine having the formula (I)

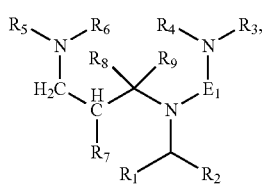

characterized in that in a first method step a diamine having the formula (II)

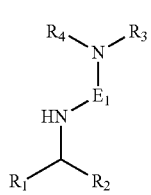

is reacted with an aldehyde having the formula (III)

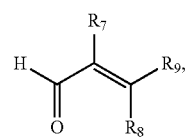

to obtain an aldehyde having the formula (IV)

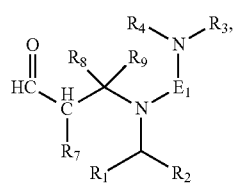

which is further reacted, in a second method step, with an amine having the formula (V)

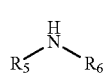

under reductive amination conditions to obtain the twin-tail triamine according to formula (I), wherein
$R_1$ and $R_2$ independently represent a $C_3$-$C_{27}$ aliphatic group,
$R_3$ and $R_4$ either independently represent a $C_1$-$C_8$ alkyl group, or are linked together to form a ring of formula

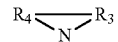

wherein $R_4$—$R_3$ represents a divalent hydrocarbon radical containing from 2 to 10 carbon atoms,
$R_5$ and $R_6$ either independently represent a $C_1$-$C_8$ alkyl group, or are linked together to form a ring of formula

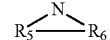

wherein $R_5$-$R_6$ represents a divalent hydrocarbon radical containing from 2 to 10 carbon atoms,
$R_7$, $R_8$ and $R_9$ independently represent hydrogen or a $C_1$-$C_8$ alkyl group, and
$E_1$ represents a linear or branched divalent hydrocarbon radical with 2 to 24 carbon atoms, which can be optionally substituted and/or interrupted by one or more heteroatom containing groups.

2. The method according to claim 1, wherein $E_1$ is —$(CH_2)_3$—, $R_3$, $R_4$, $R_5$ and $R_6$ are methyl, and $R_7$, $R_8$ and $R_9$ are hydrogen.

3. The method according to claim 1, wherein the reaction of the diamine of formula (II) with the aldehyde of formula (III) is carried out in the presence of a catalyst chosen from amine compounds free of any primary group and any secondary amine group and amidine compounds free of any primary amine group and any secondary amine group.

4. The method according to claim 3, wherein the catalyst is selected from the group consisting of pyridine, 4-dimethylaminopyridine, picoline, diazabicyclo[5.4.0]undec-7-ene and 1,5-diazabicyclo[4.3.0]non-5-ene.

5. The method according to claim 1, wherein at least one method step is carried out in the presence of an organic solvent selected from the group consisting of methanol, ethanol, isopropanol, tert-butanol, tetrahydrofuran, 2-methyltetrahydrofuran, diethyl ether, methyl tert-butyl ether, 1,4-dioxane, dimethoxyethane, diglyme and mixtures thereof.

6. The method according to claim 1, wherein the reductive amination of the second method step is carried out at temperatures from 10 to 40° C. and at a hydrogen pressure from 40 to 60 bar by using a transition metal based catalyst supported on a carrier.

7. The method according to claim 6, wherein the metal of the transition metal based catalyst is a noble metal and the carrier is carbon.

8. The method according to claim 1, wherein the first and second method steps are carried out in a one-pot sequence.

9. The method according to claim 1, wherein the obtained twin-tail triamine is further reacted with a compound having the following formula (VI)

wherein Y—R$_O$ represents either hydrogen peroxide or a compound in which Y is a leaving group and R$_O$ is -Alk-CH(OH)—CH$_2$—SO$_3$M or -Alk-CO$_2$M, wherein Alk represents an alkanediyl group and M is an alkaline metal or hydrogen to obtain a twin-tail amine zwitterionic derivative having the following formula (Ia),

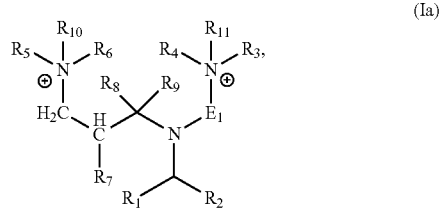

wherein R$_1$, R$_2$, R$_3$, R$_4$, R$_5$, R$_6$, R$_7$, R$_8$, R$_9$ and E$_1$ are in accordance with the definitions for R$_1$, R$_2$, R$_3$, R$_4$, R$_5$, R$_6$, R$_7$, R$_8$, R$_9$ and E$_1$ of claim 1 and R$_{10}$ and R$_{11}$, which may be the same or different at each occurrence, represent a group selected from —O$^-$, -Alk-CH(OH)—CH$_2$—SO$_3^-$ and -Alk-CO$_2^-$ wherein Alk represents an alkanediyl group.

10. The method according to claim 1, further comprising producing the diamine having the formula (II)

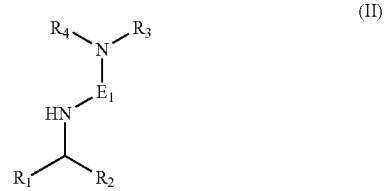

characterized in that a ketone having the formula (VII)

is reacted with a diamine having the formula (VIII)

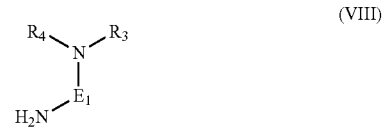

under reductive amination conditions by using a transition metal based catalyst supported on a carrier, at a temperature from 50 to 250° C. and under hydrogen pressure from 2 and 100 bar, wherein the reductive amination is not induced by a Lewis acid,
wherein
R$_1$ and R$_2$ independently represent a C$_3$-C$_{27}$ aliphatic group,
R$_3$ and R$_4$ either independently represent a C$_1$-C$_8$ alkyl group, or are linked together to form a ring of formula

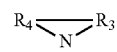

wherein R$_4$—R$_3$ represents a divalent hydrocarbon radical containing from 2 to 10 carbon atoms, and
E$_1$ represents a linear or branched divalent hydrocarbon radical with 2 to 24 carbon atoms, which can be optionally substituted and/or interrupted by one or more heteroatom containing groups.

11. The method according to claim 5, wherein the organic solvent is tetrahydrofuran.

12. The method according to claim 7, wherein the noble metal is Pt.

13. The method according to claim 10, wherein the transition metal of the catalyst is a noble metal.

14. The method according to claim 10, wherein the transition metal of the catalyst is selected from the group consisting of Pd, Pt, Rh, Ru, and mixture thereof.

15. The method according to claim 10, wherein the transition metal of the catalyst is Pt.

16. The method according to claim 10, wherein the carrier is selected from group consisting of carbon, silica, alumina, titania, zirconia, magnesia, ceria, zeolite, diatomaceous earth, and combinations thereof.

17. The method according to claim 10, wherein the carrier is carbon.

18. The method according to claim 10, wherein the reductive amination is carried out in the presence of an organic solvent selected from the group consisting of an aliphatic hydrocarbon having 5 to 10 carbon atoms, an aliphatic alcohol having 1 to 10 atom, an aromatic hydrocarbon having 6 to 20 carbon atoms, an oxygen-contain hydrocarbon having 4 to 10 carbon atoms, a nitrogen-containing hydrocarbon having 4 to 1o atoms, oxygen-containing aromatic hydrocarbon having 6 to 20 carbon atoms, nitrogen-containing aromatic hydrocarbon having 6 to 20 carbon atoms, and mixtures thereof.

\* \* \* \* \*